(12) United States Patent
Kirschbaum

(10) Patent No.: US 9,004,990 B2
(45) Date of Patent: Apr. 14, 2015

(54) DEVICE FOR SECURING ANIMAL CARCASS FOR BUTCHERING

(71) Applicant: Kevin Kirschbaum, Shelbyville, IN (US)

(72) Inventor: Kevin Kirschbaum, Shelbyville, IN (US)

(*) Notice: Subject to any disclaimer, the term of this patent is extended or adjusted under 35 U.S.C. 154(b) by 0 days.

(21) Appl. No.: 14/018,642

(22) Filed: Sep. 5, 2013

(65) Prior Publication Data

US 2015/0065021 A1  Mar. 5, 2015

(51) Int. Cl.
*A01B 13/00* (2006.01)
*A22B 5/06* (2006.01)

(52) U.S. Cl.
CPC .................... *A22B 5/06* (2013.01)

(58) Field of Classification Search
USPC .................................. 452/187–192
See application file for complete search history.

(56) References Cited

U.S. PATENT DOCUMENTS

| | | | |
|---|---|---|---|
| 916,010 A | 3/1909 | Poist | |
| 1,023,148 A * | 4/1912 | Hartman | 452/189 |
| 1,532,974 A * | 4/1925 | Dougherty et al. | 452/188 |
| 1,863,743 A * | 6/1932 | Joseph Burns | 452/187 |
| 4,338,703 A | 7/1982 | Tanner | |
| 4,903,372 A | 2/1990 | Jones | |
| 5,005,257 A | 4/1991 | Bailey | |
| 5,236,386 A | 8/1993 | Dingee | |
| 5,562,534 A | 10/1996 | McGough | |
| 5,791,858 A * | 8/1998 | Sasser | 414/462 |
| 5,873,776 A | 2/1999 | Klepac | |
| 6,017,269 A * | 1/2000 | Altenpohl, III | 452/188 |
| 6,705,821 B2 | 3/2004 | Philipps et al. | |
| 6,739,964 B2 | 5/2004 | Gearhart | |
| 7,476,149 B2 | 1/2009 | Burrows | |
| 7,485,032 B1 | 2/2009 | Hogue | |
| 7,806,755 B1 * | 10/2010 | Martinelli et al. | 452/187 |
| 8,210,912 B2 | 7/2012 | Ugiansky | |
| 2005/0104052 A1 | 5/2005 | Bilcik | |

* cited by examiner

*Primary Examiner* — Richard Price, Jr.
(74) *Attorney, Agent, or Firm* — Woodward Emhardt Moriarty McNett & Henry LLP

(57) ABSTRACT

A device for use in suspending an animal carcass in an elevated condition includes a device body having an upper section which is integral with a lower section by way of a compound bend. The upper section is formed with a protrusion and the lower section includes a plurality of arms. The animal carcass includes a pelvic bone and the device is constructed and arranged to be positionable within the animal carcass such that the protrusion engages the pelvic bone in order to suspend the animal carcass in the elevated condition.

20 Claims, 5 Drawing Sheets

Side View

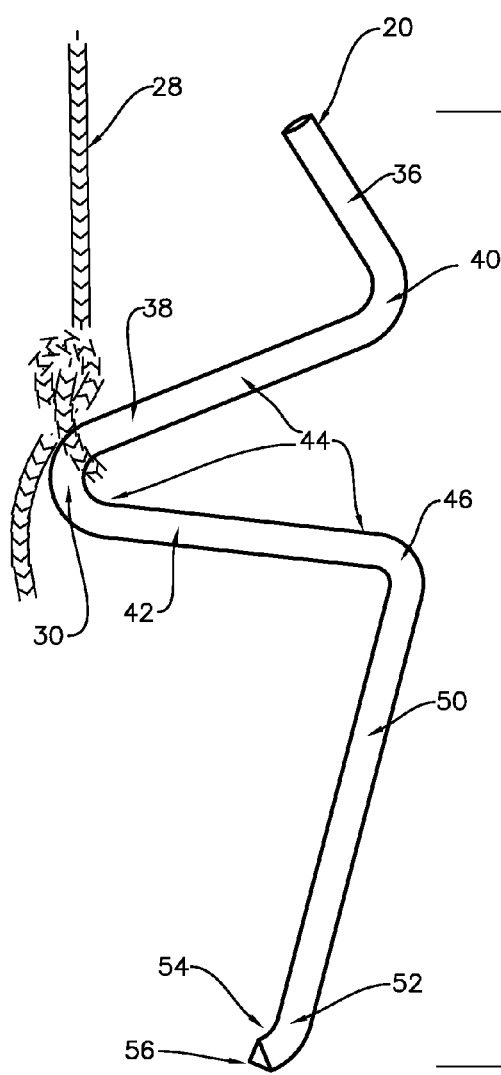
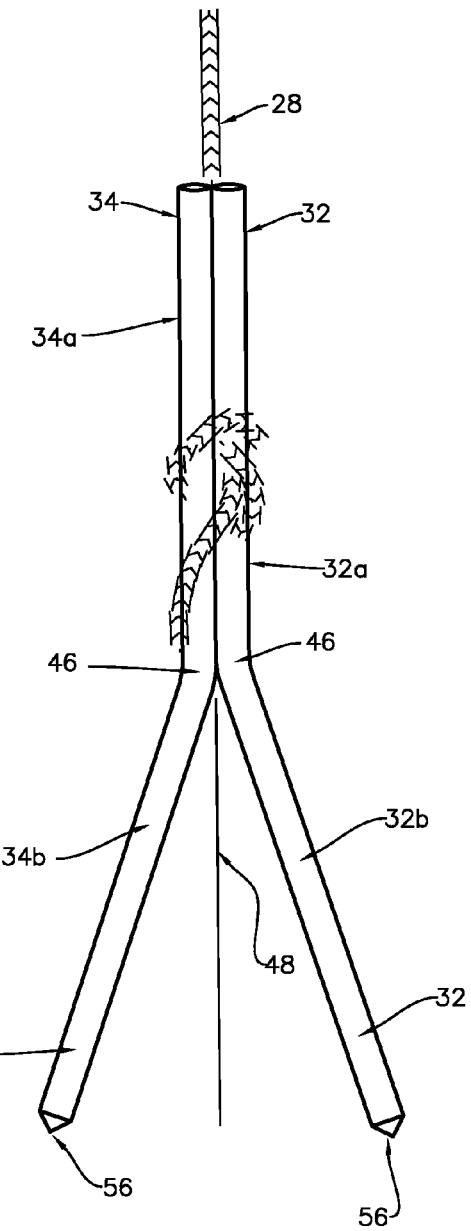
FIG. 1
Side View
FIG. 2
Front View

Front View

Side View

Side View

Front View

DEVICE FOR SECURING ANIMAL CARCASS FOR BUTCHERING

BACKGROUND

One aspect of a successful hunting venture is the need to butcher the animal, such as a deer. The preferred approach is to suspend the animal following field dressing above the ground for further work by the hunter, i.e. skinning and processing the meat. There may also be a desire to suspend a livestock animal for skinning and processing of the meat.

The disclosed embodiment presents a new device for attaching to and securing field-dressed game or a livestock animal for processing. In particular the disclosed embodiment pertains to a device and method of securing a hoisting mechanism directly to the animal. The device of the disclosed embodiment consists of a metal apparatus to which is attached a rope or hook which is fastened to a rope, the rope or rope/hook combination having been first passed through the pelvic bone of the animal, from its dorsal side through to the ventral, and then hooked or looped to a bend in the device. When lifting force is applied to the rope, the device is pulled against the pelvic area in a manner that securely holds the animal in a suspended position for skinning and processing of the meat. The lower portion of the device consists of two legs with sharpened points, such that the heavier the animal the greater grip the device provides by using gravity to advantage. The center portion of the device consists of a bend to which the hoisting rope is connected, offset to the rear so as to have the effect of pulling the device into the fleshy portion of the pelvic bone as lifting force is applied to the rope and gravity forces the pelvic bone against the device. The upper portion of the device consists of an arm which rests against the upper part of the pelvic bone to provide stability.

The device permits the processing of all meat in the animal without any need to lower and re-suspend, because the hind legs are not involved in hanging or suspending the animal, and so they are left free to be processed. After all usable meat is removed from the animal all that essentially remains is the waste portion of the carcass. All meat has been removed in one operation without the need to reposition the animal.

There have been a number of patents issued which relate to the art of suspension of animals for the purpose of processing. The vast majority of patents which pertain to suspending game animals, particularly deer, deal in some way with an apparatus or support structure from which to hang the animal, such as a folding device which mounts in the receiver hitch of a motor vehicle (U.S. Pat. No. 6,705,821), or a device which may be taken into the field and is used to suspend an animal from a tree or other available point of contact (U.S. Pat. No. 6,739,964). Notably, such inventions do not lay claim to a new device or method of actually securing to the animal itself, but instead incorporate the use of what the hunting industry terms the "gambrel hook". The gambrel hook has long been the state of the art in terms of providing the link between the animal and whatever device the user chooses to raise the animal, whether it be a block and tackle or one of the aforementioned lifting contraptions.

The gambrel hook is extremely widespread in use among hunters and consists of a length of steel or similar material, with a sharp point in either end. Each sharp point is inserted through the hide between the Achilles tendon and the femur of the animal, one end of the device for each leg. The length of the gambrel hook acts to spread the legs of the animal and a rope is attached to the center of the hook and thus the animal is raised by the ankles for processing.

While there are various types of meat hook inventions, these devices appear to be simple hooks and/or rely on piercing the meat itself, and thus depend upon the meat not tearing out during processing. The device of the preferred embodiment instead relies upon the strength of the pelvic bone as the point of suspension, a much stronger connection, and gravity which holds the device tight against the pelvic bone.

SUMMARY

A device for use in suspending an animal carcass in an elevated condition includes a device body having an upper section which is integral with a lower section by way of a compound bend. The upper section is formed with a protrusion and the lower section includes a plurality of arms. The animal carcass includes a pelvic bone and the device is constructed and arranged to be positionable within the animal carcass such that the protrusion engages the pelvic bone in order to suspend the animal carcass in the elevated condition.

BRIEF DESCRIPTION OF THE DRAWINGS

FIG. 1 is a side elevational view for a device for securing an animal carcass in an elevated condition according to a preferred embodiment.

FIG. 2 is a front elevational view of the FIG. 1 device.

DESCRIPTION OF THE SELECTED EMBODIMENTS

Figure 3:
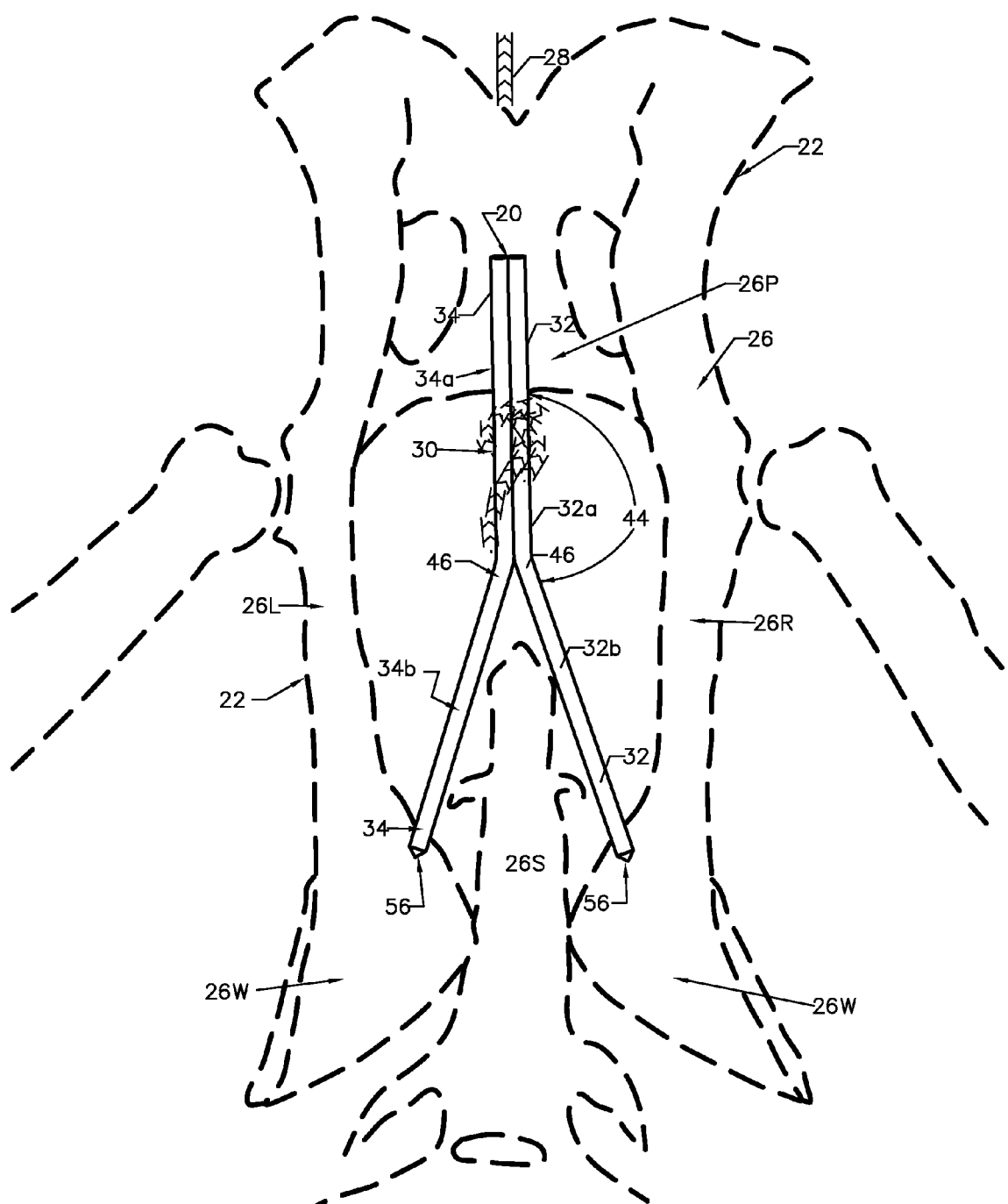
FIG. 3 is a front elevational view of the FIG. 1 device as anchored into the bone structure of an animal which is shown in broken line form.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

Referring to FIGS. 1 through 6, there is illustrated a device 20 which is constructed and arranged to be anchored into the bone structure 22 of an animal carcass 24 for butchering. Device 20 is suitable for use for field-dressed game as well as livestock. Whenever the carcass of the game or animal is desired to be suspended at some height off of the ground, device 20 provides an improved structure for doing so, in a novel and unobvious manner.

With the current state of the art, the gambrel hook, the animal can only be processed and meat removed until it is time to remove the rear leg quarters. Then the animal must be lowered to the ground in order to finish processing by removing the legs, because the ankles are the point of contact for the lifting mechanism. Device 20 is constructed and arranged to permit thorough and complete butchering without the need for lowering the animal in the middle of the process. With device 20 the legs are left free for removal inasmuch as they are not involved in suspending the carcass 24. An added improvement over the current state of the art with device 20 is that the legs are left during the process to rest in a lowered position which is more conducive to increased drainage of blood from the legs. Improved blood drainage from the meat in the leg quarters of the carcass 24 means that the meat does not spoil as quickly and thus is of improved quality. It is generally understood, at least in the context of hunting, that unless one has cold storage and therefore the luxury of time for butchering, time is of the essence and quicker processing results in the improved quality of the meat.

Figure 4:
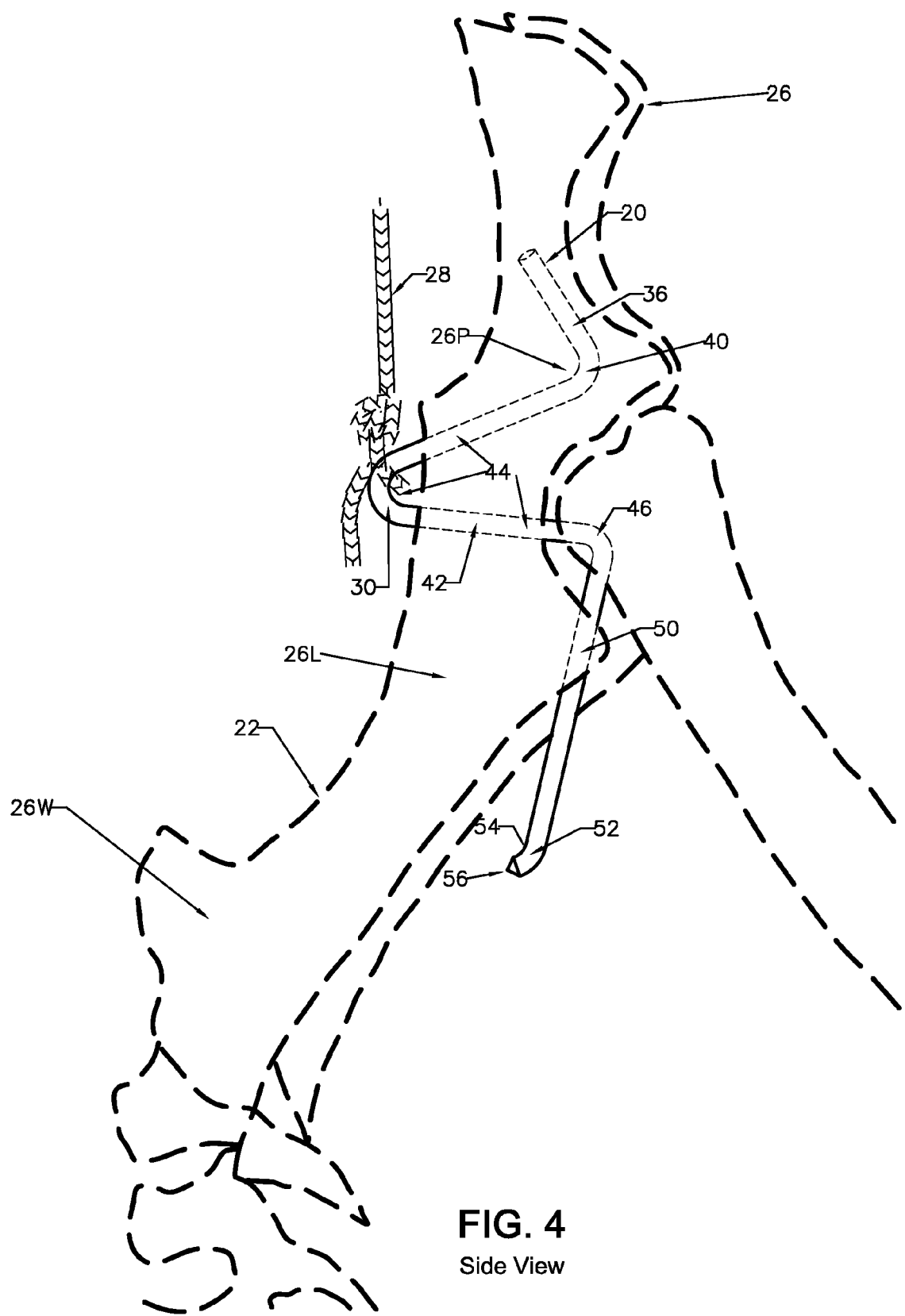
FIG. 4 is a side elevational view of the FIG. 1 device as anchored into the bone structure of an animal which is shown in broken line form.

Device 20 provides an improved point of contact within the bone structure 22 for suspending a large animal or side of meat to be processed. Unlike a conventional meat hook, device 20 does not hook to the meat itself, which could be susceptible to tearing. Rather, with device 20 contact is made with the pelvic bone 26 of the bone structure 22 and its associated cartilage and flesh. Device 20 provides a secure grip against a very strong bone which only becomes more secure the heavier the animal due to gravitational forces and the direction of engagement. The natural void in the pelvic bone and flesh, as illustrated in FIGS. 3 and 4, makes a logical point through which to pass the connecting rope 28 and the rearward bend 30 to which the rope is connected engages the pelvic bone 26 at the proper angle for a secure engagement.

With reference to FIGS. 1 and 2, device 20 has a unique construction and geometry. Device 20 includes two metal rods 32 and 34 which are formed into the shapes which are illustrated with the corresponding upper sections 32a and 34a, respectively, being welded together or otherwise joined together into a secure and rigid combination (see FIG. 2). The reverse angle or bend of the two lower sections 32b and 34b result in the inverted, Y-shaped structure of device 20 as illustrated in FIG. 2. These lower sections of each metal rod appear as outwardly diverging arms.

Figure 5:
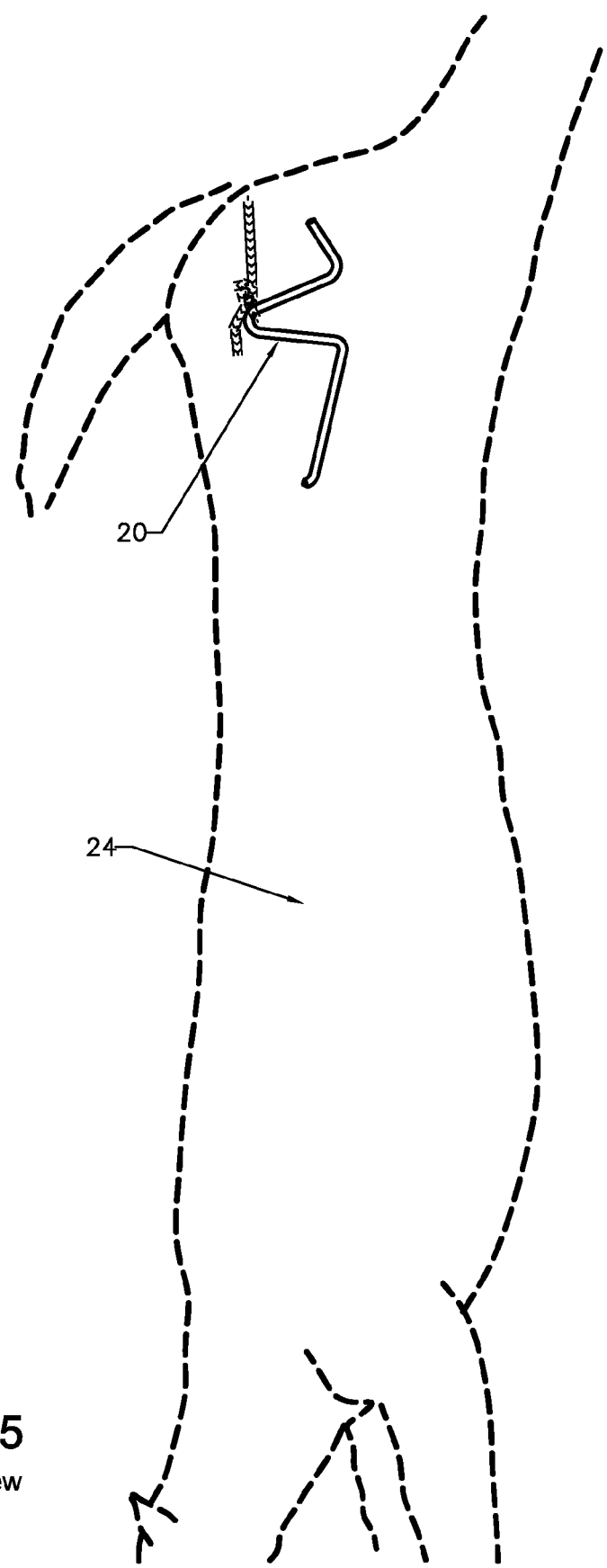
FIG. 5 is a side elevational view of the FIG. 1 device with a diagrammatic representation of the animal carcass.

Each rod 32 and 34 includes a first, generally straight portion 36 which is integral with a second, generally straight portion 38 via intermediate bend 40. Portion 38 is integral with generally straight portion 42 via intermediate bend 30. Portion 42 ends at compound bend 46. The combination of portions 38 and 42 along with bend 30 create a protrusion 44. Protrusion 44 provides portions 38 which in cooperation with portions 36 are constructed and arranged to engage the pelvic bone 26 at the proper angle for supporting the carcass 24. Protrusion 44 also provides bend 30 which is used as the means for suspending the carcass. In terms of overall orientation and configuration, protrusion 44 is described as being rearwardly directed, but this frame of reference obviously depends on one's perspective or positioning and the illustrations of FIGS. 1 and 2 should adequately describe portions 44 relative to the remainder of device 20. FIG. 5 shows the positioning of device 20 when engaging the pelvic bone of the carcass 24. The reference to "FRONT" in FIG. 1 means the direction the carcass is approached which is the ventral side of the carcass.

The upper section 32a of rod 32 ends at its bend 46 and the lower section 32b of rod 32 begins at its bend 46. Bend 46 is best considered as having midpoint or center which is the dividing point between the upper section 32a and the lower section 32b.

The upper section 34a of rod 34 ends at its bend 46 and the lower section 34b of rod 34 begins at its bend 46. Bend 46 is best considered as having a midpoint or center which is the dividing point between the upper section 34a and the lower section 34b.

Each bend 46 is described as being "compound" as it has one direction of bend for its corresponding lower section relative to its corresponding upper section (see FIG. 1) and another direction of bend to flare the lower section of each rod outwardly relatively to longitudinal centerline 48, see FIG. 2.

The generally straight portion 50 of each rod lower section 32b and 34b extends from its corresponding bend 46 to its corresponding bend 52. The small portion 54 of each lower section 32b and 34b which extends from its corresponding bend 52 includes a pointed tip 56.

When device 20 is in use and suspending a carcass 24, a rope 28 is used and is securely tied to a part of the welded portion of device 20, preferably at or adjacent to bend 30 and thus is securely tied or otherwise attached to protrusion 44. While a rope 28 is illustrated, virtually any type of suspension structure can be used so along as it can be securely tied, connected or attached to device 20 in the vicinity of bend 30 and so long as it has sufficient strength to suspend the carcass 24 in an elevated condition.

As for the size and selected material for rods 32 and 34, it is important to select a size which will properly interface with the size of the bone structure 22 and properly engage the pelvic bone for suspension of the carcass. As for the selected material, a material with the necessary strength is required such that the various bends do not straighten out or elongate under the weight of the carcass. If welding is the preferred method of joining together rods 32 and 34, as disclosed herein, then the selected material for rods 32 and 34 needs to be compatible with welding. If threaded fasteners or rivets are used for joining together the two rods 32 and 34, then there will be other material choices available. The cross-sectional shape of each rod is preferably round, but other cross-sectional shapes are acceptable.

Figure 6:
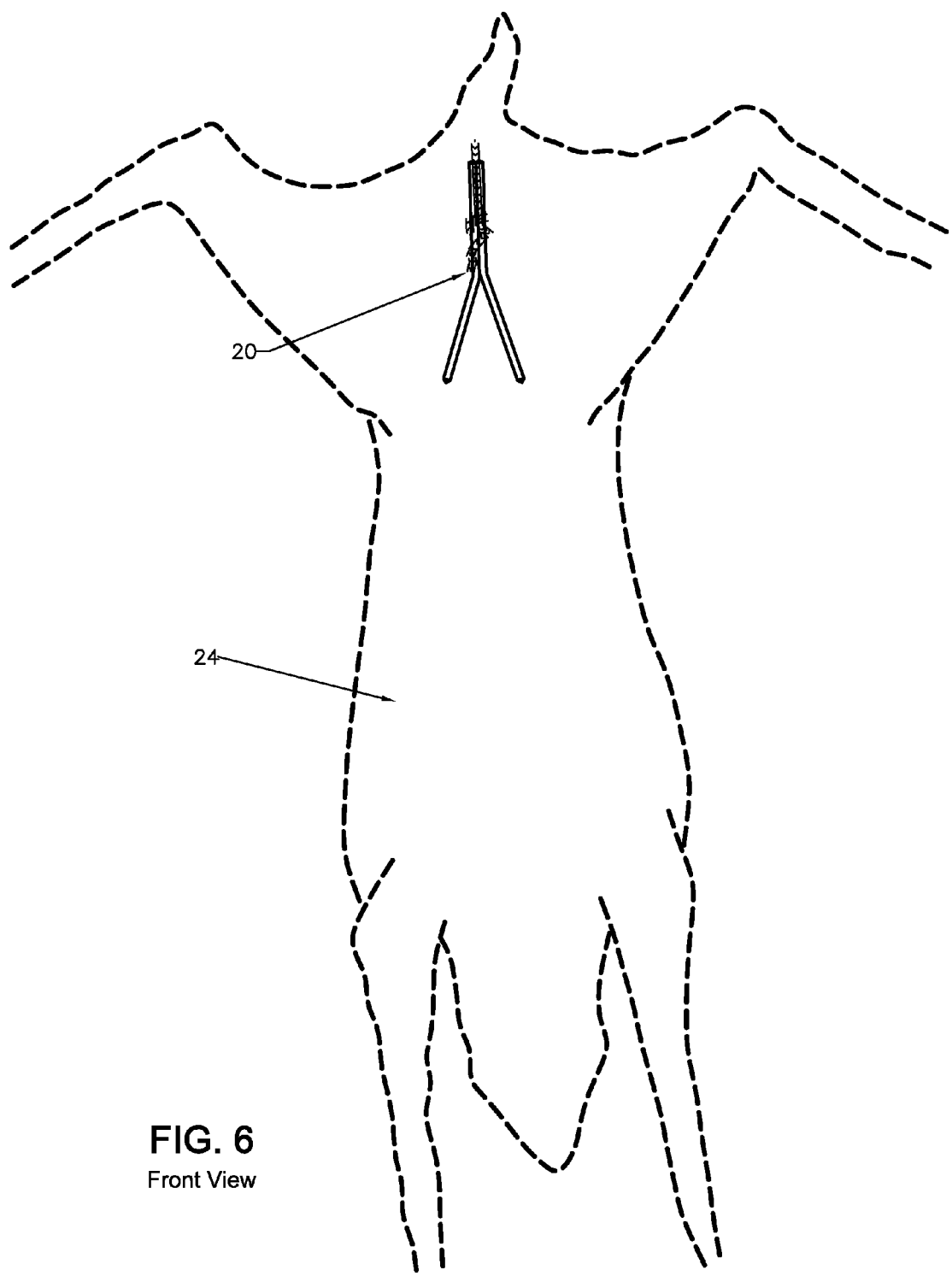
FIG. 6 is a front elevational view of the FIG. 1 device with a diagrammatic representation of the FIG. 5 animal carcass.

In use, device 20 with rope 28 securely attached to the bend 30, is inserted into the carcass 24 and aligned with the ventral side of the pelvic bone 26, which is exposed to the user by virtue of the animal having been field dressed. At the same time, the rope 28 is passed from the ventral side of the pelvic bone 26 through the opening in said pelvic bone 26 which naturally occurs between the left illium 26L, the right illium 26R, the pubis 26P, and the sacrum 26S (FIG. 3). The rope 28 thereafter is drawn through from the dorsal aspect of the pelvic bone 26 pulling the device 20 against the pelvic bone 26. The pointed tips 56 of each lower section 32b and 34b are positioned to correspond to natural indentations or grooves in the pelvic bone 26 and flesh, in particular the shallow flesh which overlays the wings of the illium 26W (see FIGS. 3 and 4). The straight portion 36 of each rod 32 and 34 is positioned to engage the pubis 26P (FIG. 3). By so doing the protrusion 44 fits inside of the aforementioned opening in the pelvic bone 26 through which the rope 28 was passed. The next step is to secure the exposed, free end of the rope 28 to some type of structure and/or lifting mechanism. For example, the rope 28 could be fastened to a block and tackle mechanism, to a support stand, to a tree limb, or to some elevated portion of a structure. The key here is to have an elevated location for securing the rope 28 so that the carcass 24 can be lifted and suspended above the ground and remain there while work is being done, as illustrated in FIGS. 5 and 6. Whatever structure or point of securement for rope 28 is selected, it should preferably be at a high enough elevation to allow the carcass 24 to be fully extended without touching the ground. Further, the selected structure or point of securement must be strong enough to handle the weight of the carcass 24.

As tension is placed on the rope 28, the device 20 is brought to rest against the ventral side of the pelvic bone 26 of the carcass 24 such that the sharp tips 56 of each lower section 32 and 34b are forced against and grip securely the pelvic bone 26 and its flesh, permitting the carcass 24 to be entirely supported in this area. The straight portion 36 of the rods 32 and 34 is forced against the pubis 26P of the pelvic bone 26 providing further stability and positioning of the device 20. Due to gravitational forces, the more the carcass weighs, the more force with which device 20 is drawn against the pelvic bone 26, and the more securely the device 20 grips the pelvic bone 26 and associated pelvic bone surface flesh (see FIGS. 3 and 4).

As previously explained, the shaping of device 20 with the rearward bend 30 in each rod 32, 34 allows this portion of the device 20 to engage the pelvic bone 26 at the proper angle for a secure connection and support of the carcass 24 in a suspended condition.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by following claims are desired to be protected. All publications, patents, and patent applications cited in this specification are herein incorporated by reference as if each individual publication, patent, or patent application were specifically and individually indicated to be incorporated by reference and set forth in its entirety herein.

The invention claimed is:

1. A device adapted to engage the pelvic bone of an animal carcass for use in suspending said animal carcass, said device comprises:
    a device body having an upper section and an integral lower section with a bend therebetween;
    said upper section including means for suspending;
    said lower section including a plurality of arms; and
    said device is adpated to engage said pelvic bone for use in suspending said animal carcass.

2. The device of claim 1 wherein each arm of said plurality of arms includes a pointed tip.

3. The device of claim 2 wherein positioning of said device within said carcass allows the pointed tip of each arm to engage a flesh portion adjacent to said pelvic bone.

4. The device of claim 1 wherein said device body is constructed from two metal rods which are each formed into a desired configuration and are joined together.

5. The device of claim 4 wherein the joinder of said two metal rods creates said upper section.

6. The device of claim 5 wherein said two metal rods diverge from a longitudinal centerline for forming said lower section.

7. The device of claim 1 wherein said means for suspending is a bend formed in said device body.

8. The device of claim 1 wherein said upper section includes a first portion for engaging one portion of said pelvic bone and a second portion for engaging another portion of said pelvic bone.

9. The device of claim 8 wherein said first portion is on one side of the pelvic bone and said means for suspending is another side of said pelvic bone.

10. In combination:
    a suspension member; and
        a device for use in suspending an animal carcass in an elevated condition, said device comprising:
        a device body having an upper section and an integral lower section with a bend therebetween;
    said upper section including means for suspending;
    said lower section including a plurality of arms; and
        said device is adapted to engage to engage said pelvic bone for use in suspending said animal carcass; and
    wherein said suspension member is secured to said means for suspending.

11. The combination of claim 10 wherein each arm of said plurality of arms includes a pointed tip.

12. The combination of claim 11 wherein positioning of said device within said carcass allows the pointed tip of each arm to engage a flesh portion adjacent said pelvic bone.

13. The combination of claim 10 wherein said device body is constructed from two metal rods which are each formed into a desired configuration and are joined together.

14. The combination of claim 13 wherein the joinder of said two metal rods creates said upper section.

15. The combination of claim 14 wherein said two metal rods diverge from longitudinal centerline for forming said lower section.

16. The combination of claim 10 wherein said means for suspending is a bend formed in said device body.

17. The combination of claim 10 wherein said upper section includes a first portion for engaging one portion of said pelvic bone and a second portion for engaging another portion of said pelvic bone.

18. The combination of claim 17 wherein said first portion is on one side of the pelvic bone and said means for suspending is on another side of said pelvic bone.

19. A method of suspending an animal carcass in an elevated condition, said animal carcass including a pelvic bone, said method comprising the following steps:
    (a) providing a device which is adapted to engage the pelvic bone of an animal carcass;
    (b) securing a suspension member to said device;
    (c) positioning said device inside said animal carcass so that one portion of said device engages said pelvic bone; and
    (d) lifting said animal carcass by using said suspension member.

20. The method of claim 19 which further includes the step of passing said suspension member through said animal carcass for securement to another structure for suspending said animal carcass in an elevated condition.

* * * * *